April 13, 1954
A. E. RICH
2,674,881
DEPTH INDICATOR FOR BOATS
Filed Aug. 29, 1951
2 Sheets-Sheet 1
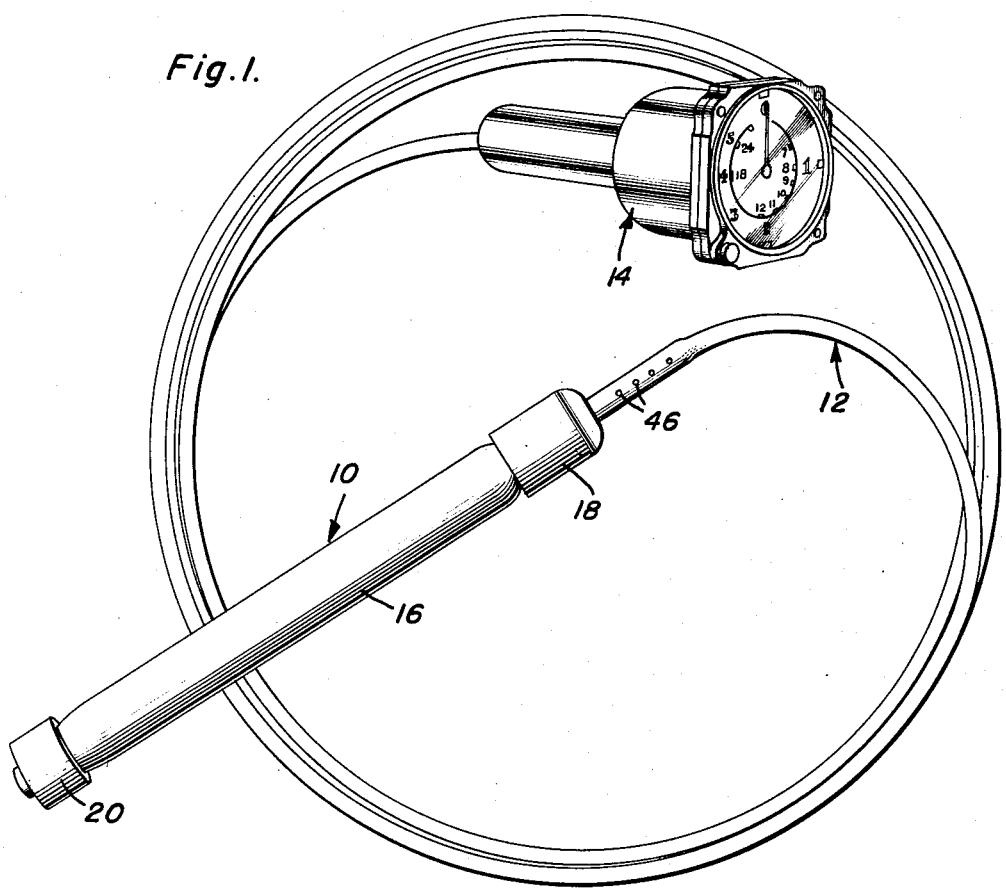
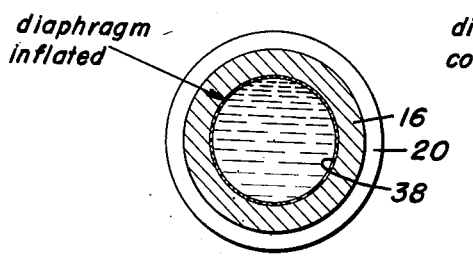
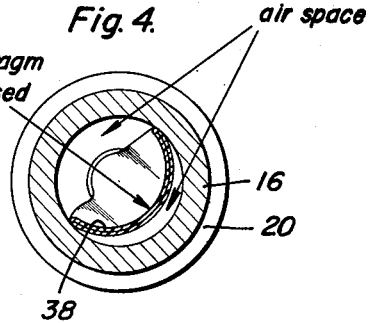
Alan E. Rich
INVENTOR.
BY
Attorneys April 13, 1954    A. E. RICH    2,674,881
DEPTH INDICATOR FOR BOATS
Filed Aug. 29, 1951    2 Sheets-Sheet 2

Alan E. Rich
INVENTOR.
BY
Attorneys

Patented Apr. 13, 1954

2,674,881

UNITED STATES PATENT OFFICE 2,674,881

DEPTH INDICATOR FOR BOATS

Alan E. Rich, Longmeadow, Mass.

Application August 29, 1951, Serial No. 244,244

2 Claims. (Cl. 73—300)

This invention comprises novel and useful improvements in a depth indicator for boats and more specifically pertains to an improved construction of shoal water indicator.

The primary object of this invention is to provide a shoal water depth gauge which shall be extremely sensitive for small variations in depths, as for example variations of a fraction of a foot in the depth to which the gauge is immersed, the gauge being extremely accurate, sensitive, dependable and sturdy in its operation for depths up to twenty-five to fifty feet.

A still further object of the invention is to provide an improved depth gauge in accordance with the preceding object in which the hydrostatic head of the depth to which the gauge is immersed shall be utilized to cause a positive displacement of air or other fluid from the gauge to a recorder of any suitable type.

A still further object of the invention is to provide a depth gauge in which the liquid in which the gauge is immersed shall be inducted in the interior of the device but prevented from passing into the inner passages for effecting positive air displacement from the device, which air displacement is utilized to obtain a depth reading upon an indicator.

Yet another important object of the invention is to provide an improved depth gauge as set forth in the foregoing objects in which a single expansible element is utilized as the sole moving part of the gauge during its operation to thereby minimize the effects of wear, corrosion, or the like; render the device more positive and sensitive in its operation; and provide an economical and easy means of replacement of the sole element subject to wear.

A still further important object of the invention is to provide an improved depth gauge as set forth in the foregoing objects wherein a flexible air conduit constitutes the sole supporting means for raising and lowering the gauge; wherein the conduit is of an exceedingly sturdy and improved construction; and wherein improved means are provided for securing the conduit to the body of the device.

These, together with various ancillary features and objects of the invention, which will later become apparent as the following description proceeds, are attained by the present invention, preferred embodiments of which have been illustrated, by way of example only, in the accompanying drawings, wherein:

Figure 1 is a perspective view of a suitable embodiment of depth gauge incorporating therein the principles of this invention;

Figure 3 is a horizontal sectional view taken substantially upon the plane indicated by the section line 3—3 of Figure 2 and showing the expansible chamber of the gauge in its fully inflated position which is assumed when the gauge is at its maximum depth;

Figure 4 is a view similar to Figure 3 but showing the expansible element in its fully deflated or collapsed position.

Referring now more specifically to the accompanying drawings, wherein like numerals designate similar parts throughout the various views, it will be seen that the numeral 10 designates generally the head or immersion unit of a shoal water depth gauge in accordance with this invention, while the numeral 12 designates a flexible hose of any requisite length by means of which the head of the gauge 10 is secured to a depth indicator 14 of any suitable character.

Before describing the structure of this apparatus in detail, it should be understood that the same is intended to constitute an extremely sensitive instrument for measuring shallow depths, as of shoal water, and up to limits of preferably under twenty-five and not more than fifty feet. In such usages, it is frequently desirable to measure the depth of water or the depth below the surface of a liquid very exactly, as for example, to fractions of a foot. Such instruments are especially useful for charting shallow waters, for accurately ascertaining the depth of water below small boats, boats in shallow waters and the like, as well as measuring for great accuracy the depths of certain liquids in their containers.

It should also be observed that the device is especially useful as for accurately taking soundings and depth readings from small boats or from power boats in advance of large ships, and especially for naval use in warfare, and may be employed in pilot boats which are remotely controlled from a parent ship by various remote control systems and devices.

Figure 2:
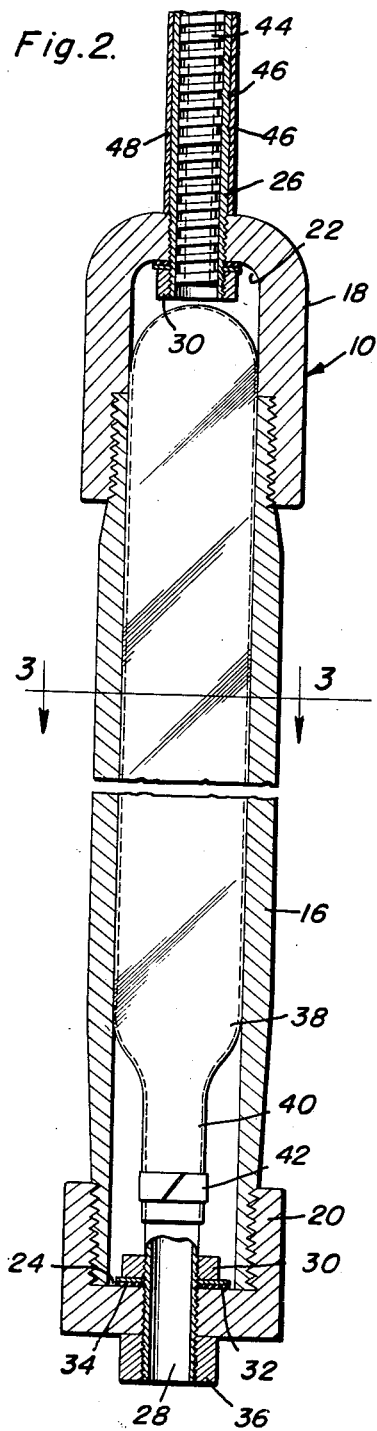
Figure 2 is a vertical central longitudinal sectional view, parts being broken away, showing the internal construction of the immersion element of the gauge.

Referring now more specifically to the particular apparatus forming the subject of this invention, it will be seen that the head or immersion unit 10, as shown in Figures 2 and 3, conveniently consists of a hollow casing in the form of a cylinder or sleeve 16 of any suitable material such as metal, plastic or the like.

Figure 5:
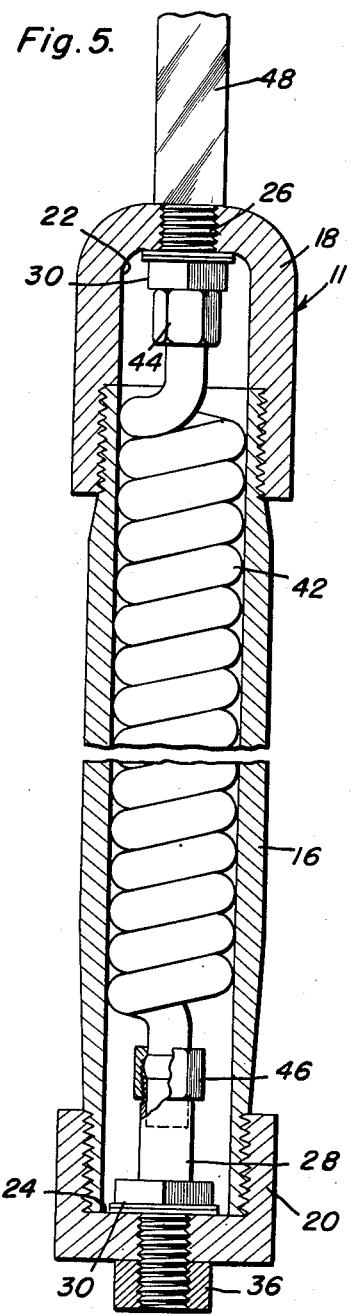
Figure 5 is a view similar to Figure 2 but of a modified construction of gauge which may be employed in certain instances.

The casing 16 of the heads or immersion units 10 of Figure 2 or 11 of Figure 5 have open screw threaded opposite ends which are closed by detachable caps 18 and 20 respectively. The cap 18 is preferably provided with a rounded top wall 22, while the cap 20 is provided with a flat bottom wall 24.

It is evident that the principles of this invention are not limited to any particular size or shape of these parts, since the same may be varied in accordance with the particular usages to which the device is to be put.

A pair of hollow open-ended externally threaded metallic tubes 26 and 28 are received in internally threaded axial bores in the caps 18 and 20 and communicate with the interior of the casing. The inner extremities of these tubes are secured in place as by lock or fastening nuts 30 which are threaded upon the inner extremities of the tubes and which, by means of metallic washers 32 and packings or seals 34, of any conventional design, establish a fluid tight seal with the interior of their respective caps.

Where desired, the external threads of the tubes may be coated with any suitable sealing compound to further increase the efficiency of their sealing engagement with the caps.

The tube 28 is provided externally of the cap 20 with a further lock nut 36 which serves to fixedly and rigidly anchor the tube in place, with its outer end open to the liquid in which the head is to be immersed.

The flexible conduit 12, of a construction to be hereinafter set forth, is secured fixedly and in sealing engagement to the exterior portion of the tube 26 and communicates with the interior of the casing 16. The casing 16 thus constitutes an air reservoir which is in free communication with the conduit 12 and through the conduit with the interior of the depth recorder or indicator 14. Thus, as air is compressed or displaced from within the casing 16, it will be discharged up the conduit 12 and by its compression will cause a corresponding reading upon the indicator 14.

In accordance with this invention, means are provided whereby the water in which the head is immersed will be caused to enter the casing 16 and displace air therefrom in proportion to the hydrostatic head of the depth to which the head is immersed. However, this water introduced into the casing is separated from and prevented from passing upwardly into the flexible conduit or hose 12, whereby the corroding effect of seawater and the like or the other corroding effects of the liquid in which the head is immersed are prevented from damaging the interior of the flexible hose or of the indicator 14.

In the embodiment of Figure 2, a means is provided which prevents direct contact of this water or other fluid in which the head is immersed with the air or other fluid contained within the casing, although causing a positive displacement of the air or fluid from the casing in accordance with the hydrostatic pressure corresponding to the depth to which the head is immersed.

This displacing means of Figure 2, as also shown in Figures 3 and 4, comprises a flexible diaphragm in the form of an envelope 38 having a narrowed neck portion 40. This elongated envelope is preferably of a length, when substantially fully inflated, to terminate closely adjacent to the lock nut 30 of the tube 26. The neck 40 is secured to the inward extremity of the tube 28 by being tightly and embracively clamped thereon by any suitable metallic clamping band 42.

As will be clearly seen from Figure 2, the end of the neck portion 40 of the expansible member is disposed inwardly of the bottom wall 24 of the cap 20.

As will be apparent from Figure 4, before the head 10 is immersed in a liquid, the envelope will be fully collapsed so that the air space within the casing 16 will be at its maximum. At this time, the indicator 14 will register a zero reading upon its dial. As the gauge is immersed, however, water or the surrounding medium or liquid will enter the open tube 28 and penetrate into the interior of the expansible envelope 38. The latter will be expanded by the inflow of water, and the latter will displace or compress air or fluid from within the chamber 16.

It will thus be evident that air is compressed within and displaced from the chamber 16 in exact proportion to the hydrostatic head of the depth to which the head is immersed in a liquid. However, while the flexible envelope 38 does not oppose the ingress of water, it does effectively prevent direct contact of the same with the air or the internal parts and surfaces of the casing and the flexible conduit.

It is contemplated that the flexible envelope 38 may be of such length that when the same is fully expanded as shown in Figure 3, the end of the same will be closely positioned relative to the nut 30 as shown in Figure 2. Accordingly, upon a further expansion of the device, as when the head is immersed to a greater depth than that for which the apparatus is intended, the further increase or expansion of the envelope 38 will cause the end of the same to close the opening through the nut 30 and thus effectively seal the flexible hose 12 against any further displacement of air therethrough.

The arrangement of Figure 5 is identical with that of Figure 2 except that the expansible envelope is omitted and replaced by a non-expansive member. This member comprises a coil 42 of a relatively small bore and consisting of a great many convolutions or turns. The ends of this coil are detachably secured as by coupling glands 44 and 46 to the screw threaded extremities of the tubes 26 and 28. For convenience of illustration, the actual size of the coil 42 has been greatly exaggerated, it being contemplated that the space within the casing shall be substantially filled with these convolutions. The purpose of the coil is to provide an extremely long conduit connection between the tubes 26 and 28, whereby water or other liquid entering through the open end of the tube 28 will move upwardly within the coil 42 in accordance with the hydrostatic head and displace air from the upper end of this coil. By virtue of the length of the coil, it is contemplated that it will be impossible for water to entirely fill the same and pass into the flexible hose connected therewith. With the exception that the embodiment in Figure 5 is of a non-expansible character, as compared with the expansible envelope of Figure 2, the construcion and operation of these two embodiments is identical.

In both of these forms, it is contemplated that the envelope 38 or the coil 42 which constitute the sole parts of the device subjected to wear or the effects of erosion and the like may be readily and easily replaced as desired.

Reference is now made more specifically to the construction of the flexible conduit 12, which construction is utilized with both of the immersion heads 10 and 11. As shown best in Figure 2, the flexible tubular conduit comprises an inner tube in the form of a spiral metallic flexible hose 44 of any conventional and known design, the lower end of this hose being disposed within the tube 26 in a snug sliding fit therein. The tube 26 is permanently locked or engaged upon the end of the flexible metallic hose 44 by means of radially inwardly projecting deformations 46, see also Figure 1, which may be made as by punch marks or the like, whereby portions of the material of the tube are deformed and pressed inwardly into the spiral grooves of the flexible metallic hose. Thus, the hose is securely and permanently locked within the tube 26 and serves both to support the immersion head 10 and also to permit the flow of air into and from the chamber within the casing.

As above described, the flexible metallic hose 44 while possessing the requisite strength against crushing, the ability to withstand hard handling, and the necessary tensile strength to support the immersion head for raising or lowering the same, it is inadequate for preventing the escape of air therethrough. For this purpose, an external sheath or coating 48 in the form of a plastic covering is provided which tightly embraces the metallic tubing 44. This covering which is impervious to water or air, is, at its extremity, enlarged by being forced upon the exterior portion of the tube 26, upon which it may be sealed as by suitable cement or the like or secured in any other desired manner in addition to its tight frictional engagement therewith.

It will thus be seen that the flexible tube 12 possesses the necessary strength to prevent collapse of the air and water impervious plastic or other coating.

It is evident that the indicator 14 may be of any desired character which is sufficiently sensitive to accurately respond to very small variations in air pressure. An indicator operating upon the principle and of the same general type of construction employed in the well known Bendix or Pioneer aneroid barometer employed as an air speed indicator for aviation use is deemed to be sufficiently sensitive for purposes of this invention. Since, however, the present invention is not limited to any particular construction of indicator, a further explanation of the same is believed to be unnecessary.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

Having described the invention, what is claimed as new is:

1. A shoal water depth indicator comprising a hollow casing, end members removably closing the ends of said casing, tubes secured to and extending through said end members, a flexible, expansible bag disposed in said casing and secured to the inner end of one of said tubes for receiving liquid in which the casing is immersed, a flexible conduit secured to the external end of the other of said tubes for receiving air displaced from the casing by the expansion of the flexible bag therein.

2. A shoal water depth indicator comprising a tubular, open-ended cylindrical casing, tubes opening into the opposite ends of said casing, a flexible, elongated expansible bag in said casing secured to the end of one of said tubes for receiving water in which the casing is immersed, a flexible conduit secured to the external end of the other of said tubes for receiving air displaced from the casing by the expansion of the flexible bag therein, screw threaded caps closing the ends of said casing, said tubes being engaged in screw threaded bores in said caps.

References Cited in the file of this patent

UNITED STATES PATENTS

| Number | Name | Date |
|---|---|---|
| 40,028 | Ericsson | Sept. 22, 1863 |
| 756,140 | Reid et al. | Mar. 29, 1904 |
| 1,946,175 | Murphy et al. | Feb. 6, 1934 |
| 2,317,073 | Martin | Apr. 20, 1943 |
| 2,376,459 | Stevens | May 22, 1945 |

FOREIGN PATENTS

| Number | Country | Date |
|---|---|---|
| 716,334 | France | Oct. 6, 1931 |